UNITED STATES PATENT OFFICE.

J. BURROWS HYDE, OF NEW YORK, N. Y.

IMPROVEMENT IN COMPOSITIONS FOR COATING TELEGRAPH-WIRES.

Specification forming part of Letters Patent No. 19,778, dated March 30, 1858.

*To all whom it may concern:*

Be it known that I, J. BURROWS HYDE, of the city, county, and State of New York, have invented certain Improvements in Coating or Covering Telegraphic Wires to be used for Conveying Electrical Currents for Telegraphic Purposes, by which the wires are thoroughly insulated as well as further protected from moisture and other oxidizing influences, the whole being particularly adapted for subterranean or marine uses, of which the following is a full, clear, and exact description.

This insulating composition I form by mixing, by weight, one part boiled linseed, cotton-seed, or rosin oil to eight parts of good natural or artificial asphaltum, the asphaltum to be melted first, and the oil added gradually and stirred well to produce a thorough mixture of the whole. This composition should, when cold, with thermometer at freezing-point, permit the prepared wire to be bent at a radius of ten feet without cracking, and should form a coating of one-eighth inch thickness around the wire or wires.

I prefer the wire should be of iron than of copper, as being, when the surface is clean and bright, a good conductor, and, being perfectly protected by the coating, will undergo no change by oxidation, besides being far less expensive. And I prefer using three or more strands of smaller wire than one large one, gaining thereby more surface and a more certain transit of the current, obviating irregularities arising from imperfection in the metal. As neither frost, moisture, nor vermin will affect the wire when thus prepared, it need not be buried more than six to twelve inches below the surface, except on account of water-washing and agricultural digging.

A proper-contrived plow may be employed to cut the trench. The lengths of prepared wire for laying down conveniently is left to occasion, as it is designed to be coated on the line as laid down for use.

Having thus described my improved compound, I do not wish to be understood as confining myself to the precise proportions therein set forth; but

What I do claim as my invention, and desire to secure by Letters Patent, is—

An insulating compound for telegraphic wires formed by mixing boiled linseed, cotton-seed, or rosin oil with natural or artificial asphaltum, substantially in the manner as above described.

J. BURROWS HYDE.

Witnesses:
WM. H. BISHOP,
CHAS. W. BAMBURGH.